US012793333B2

(12) United States Patent
Wang et al.

(10) Patent No.: US 12,793,333 B2
(45) Date of Patent: Nov. 10, 2026

(54) SYSTEM AND METHOD WITH 3D LAYOUT MODEL GENERATOR

(71) Applicant: Robert Bosch GmbH, Stuttgart (DE)

(72) Inventors: Ruoyu Wang, Sunnyvale, CA (US); Yuliang Guo, Redwood City, CA (US); Cheng Zhao, Cupertino, CA (US); Xinyu Huang, San Jose, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 18/397,396

(22) Filed: Dec. 27, 2023

(65) Prior Publication Data

US 2025/0218113 A1 Jul. 3, 2025

(51) Int. Cl.

| | |
|---|---|
| ***G06T 17/00*** | (2006.01) |
| ***G06T 7/11*** | (2017.01) |
| ***G06T 7/521*** | (2017.01) |
| ***G06T 7/60*** | (2017.01) |
| ***G06T 7/70*** | (2017.01) |
| ***G06T 19/20*** | (2011.01) |

(52) U.S. Cl.

CPC ................ *G06T 17/00* (2013.01); *G06T 7/11* (2017.01); *G06T 7/521* (2017.01); *G06T 7/60* (2013.01); *G06T 7/70* (2017.01); *G06T 19/20* (2013.01); *G06T 2207/10028* (2013.01); *G06T 2207/20084* (2013.01); *G06T 2207/30244* (2013.01); *G06T 2219/2004* (2013.01)

(58) Field of Classification Search

CPC .. G06T 17/00; G06T 7/70; G06T 7/20; G06T 2207/10024; G06T 2207/10028; G06T 2207/20084; G06V 10/25; G06V 10/44; H04N 5/74

USPC .......................................................... 345/419

See application file for complete search history.

(56) References Cited

U.S. PATENT DOCUMENTS

2020/0111251 A1* 4/2020 Shi ....................... G06V 10/764
2020/0211284 A1* 7/2020 Lin ......................... G06T 17/00
2021/0150805 A1* 5/2021 Stekovic ................... G06T 3/10

OTHER PUBLICATIONS

Yan et al., "3D Room Layout Estimation From a Single RGB Image," IEEE Transactions on Multimedia, vol. 22, No. 11, Nov. 2020, pp. 3014-3024.

(Continued)

*Primary Examiner* — Hai Tao Sun

(74) *Attorney, Agent, or Firm* — Kathy Takeguchi; Maginot, Moore & Beck LLP

(57) ABSTRACT

A computer-implemented method and system relate to generating a three-dimensional (3D) layout model. Segmentation masks are generated using a digital image. The segmentation masks identify architectural elements in the digital image. Depth data is generated for each segmentation mask. A set of planes is generated using the depth data and the segmentation masks. Boundary estimate data is generated for the set of planes using boundary data of the segmentation masks. A set of plane segments is generated by bounding the set of planes using the boundary estimate data. Boundary tolerance data is generated for each boundary estimate data. A 3D layout model is constructed by generating at least a boundary segment that connects a first bounded plane and a second bounded plane at an intersection, which is located using the boundary estimate data and the boundary tolerance data.

20 Claims, 5 Drawing Sheets

(56) References Cited

OTHER PUBLICATIONS

Lee et al., "RoomNet: End-to-End Room Layout Estimation," Computer Vision Foundation (CVF), Open Access Version, 2017, pp. 4865-4874.
Xu et al., "Pano2CAD: Room Layout From A Single Panorama Image," IEEE Computer Society, 2017 IEEE Winter Conference on Applications of Computer Vision, pp. 354-362.

* cited by examiner

SYSTEM AND METHOD WITH 3D LAYOUT MODEL GENERATOR

TECHNICAL FIELD

This disclosure relates generally to computer vision, and more particularly to generating and using a three-dimensional layout model of an environment.

BACKGROUND

The construction of three-dimensional (3D) room layouts is useful in many applications. For example, 3D room layouts may be used in robotics, augmented reality, virtual reality, etc. In many cases, the construction of 3D room layouts often relies on red, green, blue, depth (RGBD) cameras or a light detection and ranging (LIDAR) scanner to obtain accurate boundaries of rooms. However, the use of an RGBD camera or a LIDAR scanner for constructing 3D room layouts is relatively costly as such technology comprises relatively expensive hardware.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to generating a three-dimensional (3D) layout model of an environment. The method includes receiving a digital image. The digital image comprises two-dimensional data. The method includes generating instance segmentation data using the digital image. The instance segmentation data includes segmentation masks identifying architectural elements in the digital image. The method includes generating depth data using the digital image. The method includes generating a set of planes. Each plane is generated using the depth data of a corresponding segmentation mask. The set of planes include at least a first plane and a second plane. The method includes generating boundary estimate data for the set of planes using corresponding boundary data of the segmentation masks. The method includes generating a set of plane segments by bounding the set of planes using the boundary estimate data. The set of plane segments include a first plane segment corresponding to a bounding of the first plane and a second plane segment corresponding to a bounding of the second plane. The method includes generating boundary tolerance data for each boundary estimate. Each boundary tolerance data is used to create a plane buffer, which extends a corresponding boundary estimate by a predetermined distance. The method includes locating an intersection between the first plane segment and the second plane segment using the boundary estimate data and the boundary tolerance data. The method includes constructing a 3D layout model that includes at least a boundary segment connecting the first plane segment and the second plane segment at the intersection.

According to at least one aspect, a system includes at least one or more processors and one or more computer memory. The one or more computer memory are in data communication with the one or more processors. The one or more computer memory have computer readable data stored thereon. The computer readable data includes instruction that, when executed by one or more processors, causes the one or more processors to perform a method. The method includes receiving a digital image. The digital image comprises two-dimensional data. The method includes generating instance segmentation data using the digital image. The instance segmentation data includes segmentation masks identifying architectural elements in the digital image. The method includes generating depth data using the digital image. The method includes generating a set of planes. Each plane is generated using the depth data of a corresponding segmentation mask. The set of planes include at least a first plane and a second plane. The method includes generating boundary estimate data for the set of planes using corresponding boundary data of the segmentation masks. The method includes generating a set of plane segments by bounding the set of planes using the boundary estimate data. The set of plane segments include a first plane segment corresponding to a bounding of the first plane and a second plane segment corresponding to a bounding of the second plane. The method includes generating boundary tolerance data for each boundary estimate. Each boundary tolerance data is used to create a plane buffer, which extends a corresponding boundary estimate by a predetermined distance. The method includes locating an intersection between the first plane segment and the second plane segment using the boundary estimate data and the boundary tolerance data. The method includes constructing a 3D layout model that includes at least a boundary segment connecting the first plane segment and the second plane segment at the intersection.

According to at least one aspect, one or more non-transitory computer readable media have computer readable data stored thereon. The computer readable data include instructions that, when executed by one or more processors, cause the one or more processors to perform a method. The method includes receiving a digital image. The digital image comprises two-dimensional data. The method includes generating instance segmentation data using the digital image. The instance segmentation data includes segmentation masks identifying architectural elements in the digital image. The method includes generating depth data using the digital image. The method includes generating a set of planes. Each plane is generated using the depth data of a corresponding segmentation mask. The set of planes include at least a first plane and a second plane. The method includes generating boundary estimate data for the set of planes using corresponding boundary data of the segmentation masks. The method includes generating a set of plane segments by bounding the set of planes using the boundary estimate data. The set of plane segments include a first plane segment corresponding to a bounding of the first plane and a second plane segment corresponding to a bounding of the second plane. The method includes generating boundary tolerance data for each boundary estimate. Each boundary tolerance data is used to create a plane buffer, which extends a corresponding boundary estimate by a predetermined distance. The method includes locating an intersection between the first plane segment and the second plane segment using the boundary estimate data and the boundary tolerance data. The method includes constructing a 3D layout model that includes at least a boundary segment connecting the first plane segment and the second plane segment at the intersection.

These and other features, aspects, and advantages of the present invention are discussed in the following detailed description in accordance with the accompanying drawings throughout which like characters represent similar or like parts. Furthermore, the drawings are not necessarily to scale, as some features could be exaggerated or minimized to show details of particular components.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
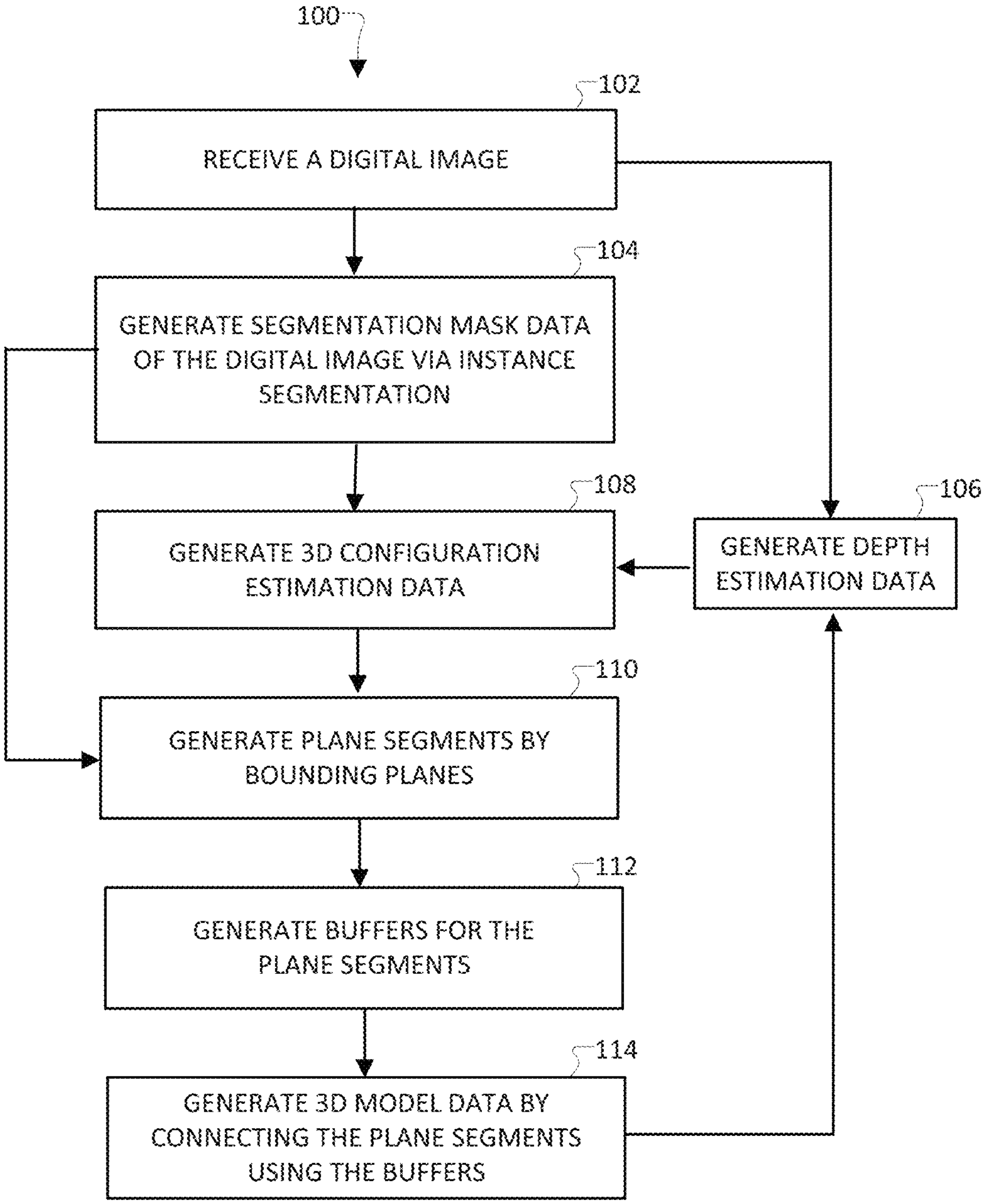
FIG. 1 is a flow diagram of an example of a method for generating a 3D layout model according to an example embodiment of this disclosure.
Figure 7:
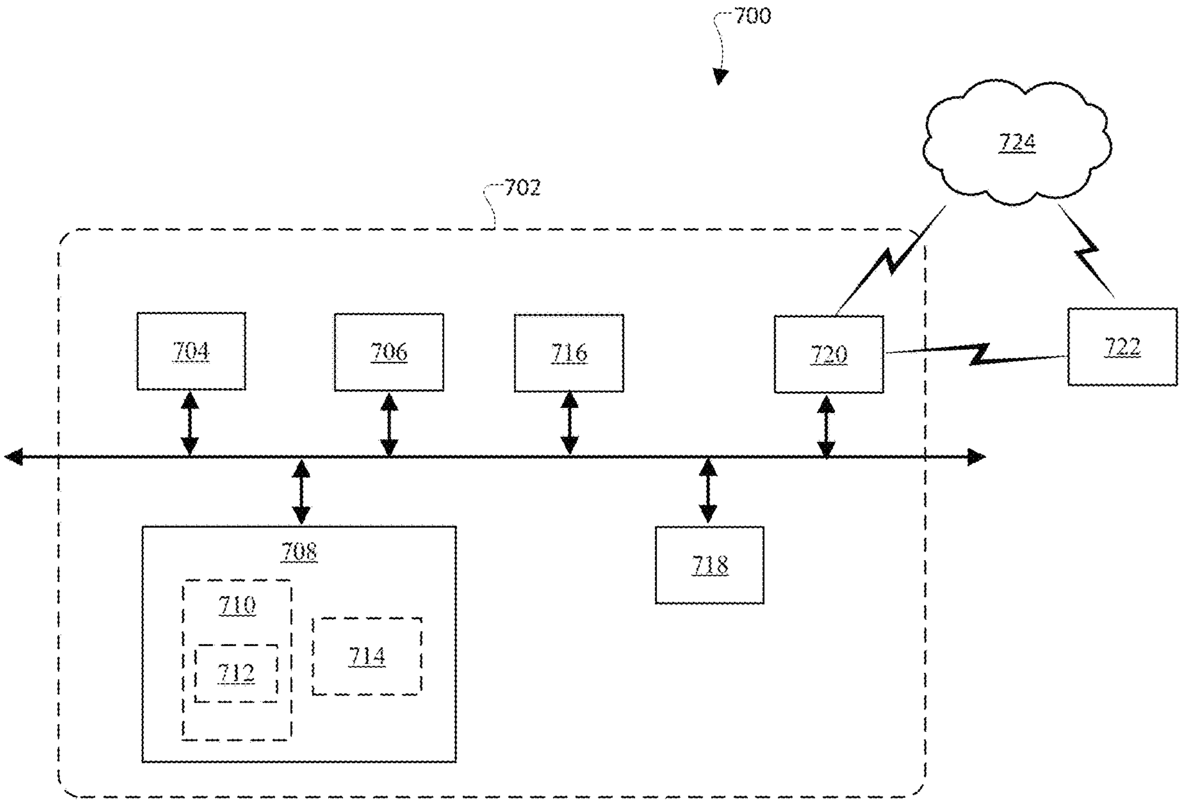
FIG. 7 is a block diagram of an example of a system that is configured to generate and use a 3D layout model and a unified 3D layout model according to an example embodiment of this disclosure.

FIG. 1 is a flow diagram that illustrates a method 100 for generating a 3D layout model via a model generation system 702 (FIG. 7) according to an example embodiment. The model generation system 702 is configured to construct a 3D room layout without requiring or using a relatively expensive depth image camera (e.g., RGBD camera). This feature is advantageous in enabling users to generate 3D layout models with professional grade (or commercial grade) levels of accuracy via digital images comprising 2D data. The method 100 is performed, via the 3D layout model generator 710 and/or the model generation system 702, by one or more processors of the processing system 704 (FIG. 7). As shown in FIG. 1, the method 100 includes a number of steps that are associated with generating a 3D layout model. The method 100 may include more steps or less steps than those steps shown in FIG. 1 provided that such modifications include similar functions and are within the spirit of the method 100.

At step 102, according to an example, the method 100 includes receiving a digital image from at least one image sensor. For example, the digital image may be a red, green, blue (RGB) image, a cyan, magenta, yellow (CMY) image, a grayscale image, or any type of image with pixels. The digital image may comprise a panoramic image or any similar type of image. In this regard, the method 100 is advantageous in that the digital image may be obtained from an image sensor that does not further include a depth sensor. The digital image includes pixel data without depth data. The method 100 only requires that the digital image include two-dimensional (2D) data. Also, the digital image displays one or more architectural elements, which is to be generated as 3D layout model. Upon receiving the digital image, the method proceeds to step 104 and step 106.

At step 104, according to an example, the method 100 includes generating instance segmentation data using at least one digital image. More specifically, the 3D layout model generator 710 is configured to receive the digital image and generate, via an ML system 712 (FIG. 7), instance segmentation data. The instance segmentation data includes a set of segmentation masks. Each segmentation mask identifies an object (e.g., architectural elements) of the digital image. For example, a segmentation mask may identify a wall, a ceiling, a floor, a door, a window, another architectural element, or another non-architectural element.

At step 106, according to an example, the method 100 includes generating depth data via a depth estimator 716 (FIG. 7). In some implementations, the depth data comprises dense depth data. In other implementations, the depth data comprises sparse depth data. More specifically, in an example embodiment, the depth estimator 716 comprises at least one machine learning model, which is configured to generate depth data or a depth map, in response to receiving the digital image as input data. As a non-limiting example, for instance, the machine learning model is a convolutional neural network (CNN), which generates depth data (e.g., dense depth estimates) corresponding to the digital image. Additionally or alternatively, the depth estimator 716 includes a computer vision (CV) algorithm to generate depth data using the digital image.

In another example embodiment, the depth estimator 716 comprises a low-cost laser rangefinder. The laser rangefinder is positioned in a vicinity of the image sensor (e.g., camera) that generates each digital image. The laser rangefinder is positioned at a predetermined distance away from the image sensor. The laser rangefinder is configured to use a laser beam to determine a distance to an object (e.g., an architectural element). The depth estimator 716 is configured to generate laser measurements (e.g., sparse laser measurements) correlated with the digital image. In this regard, the depth estimator 716 is configured to generate depth data or a depth map for the digital image at a low-cost. After the depth estimation data is generated, the method 100 proceeds to step 108.

At step 108, according to an example, the method 100 includes generating 3D configuration estimation data using the instance segmentation data, generated at step 104, and the depth data, generated at step 106. The configuration estimation data includes a set of planes. Each plane is defined by the group of depth data, which includes at least three non-collinear 3D coordinate points that are associated with a same segmentation mask. Each plane is defined by a plane equation. In this regard, the model generation system 702 and/or the 3D layout model generator 710 is configured to obtain a group of at least three non-collinear 3D point coordinates of depth data for a particular segmentation mask and then fit a plane to these 3D point coordinates. The set of planes includes a number of planes in which each plane is generated for a respective group of depth data associated with a particular segmentation mask.

As a non-limiting example, the 3D layout model generator 710 is configured to obtain a group of depth data comprising 3D point coordinates, which are associated with the segmentation mask of "floor," and generate a plane for those 3D point coordinates. In this case, the set of planes include at least the plane corresponding to an architectural element that is identified as "floor." Upon generating the 3D configuration estimation data that includes the set of planes, the method 100 proceeds to step 110.

At step 110, according to an example, the method 100 includes generating a set of plane segments by bounding the set of planes. More specifically, after generating the set of planes, the model generation system 702 obtains boundary data (e.g., edge data) of the segmentation masks. The model generation system 702 generates boundary estimate data for each plane using the boundary data of the corresponding segmentation mask. The model generation system 702 generates a plane segment for a plane by bounding that plane using the boundary estimate data associated with boundary data of a particular segmentation mask. Upon bounding each plane of the set of planes, the method 100 proceeds to step 112.

At step 112, according to an example, the method 100 includes generating boundary tolerance data for each boundary estimate data. The boundary tolerance data provides a plane segment with a plane buffer that provides a plane extension that extends outward from the boundary estimate data by a predetermined distance. The boundary tolerance data is advantageous in providing a plane buffer that extends a bounding range of a plane segment in the event that the boundary estimate data is misestimated. Upon generating boundary tolerance data for each boundary estimate data such that each plane segment includes plane buffers, the method 100 proceeds to step 114.

At step 114, according to an example, the method 100 includes constructing a 3D layout model by connecting the plane segments using the boundary estimate data and the boundary tolerance data. More specifically, upon generating the set of plane segments, the model generation system 702 and/or the 3D layout model generator 710 is configured to locate an intersection between plane segments using the boundary estimate data and the boundary tolerance data. In this regard, the intersection may be positioned within a vicinity of the boundary estimate and the boundary tolerance data. In most cases, the intersection may be located near the boundary estimate data or between the boundary estimate and boundary tolerance data. The plane segments are then connected at a boundary segment defined at the intersection between a pair of plane segments. After the plane segments are connected at intersections, then each plane segment is indicative of a planar surface, corresponding to a particular segmentation mask, (e.g., wall, floor, ceiling, etc.) and each boundary segment is indicative of a connection between that planar surface and another planar surface. Also, once the 3D layout model is generated, the 3D layout model may be used to update or enhance the depth estimator 716 and/or the depth data of step 106.

After the 3D layout model is generated at step 114, then the 3D layout model may be used in a number of different ways and a number of different applications. For example, the 3D layout model may be used to generate measurement data associated with various dimensions of the 3D layout model. The 3D layout model may be displayed by a display device or transmitted to another computing device. The 3D layout model may be combined with other 3D layout models. The 3D layout model may be modified by a user. In this regard, the 3D layout model may be outputted and/or used downstream. For example, the 3D layout model may be used downstream by a navigation system to navigate a mobile robot around a room or a part of a building. Also, the 3D layout model is configured to be aligned and combined with one or more other 3D layout models to generate a unified 3D layout model. For example, the 3D layout model may be aligned and combined with another architectural structure (e.g., one or more walls) and/or another 3D layout model (e.g., one or more rooms) to create a unified 3D layout model that shows a greater portion of a house/building.

Figure 2:
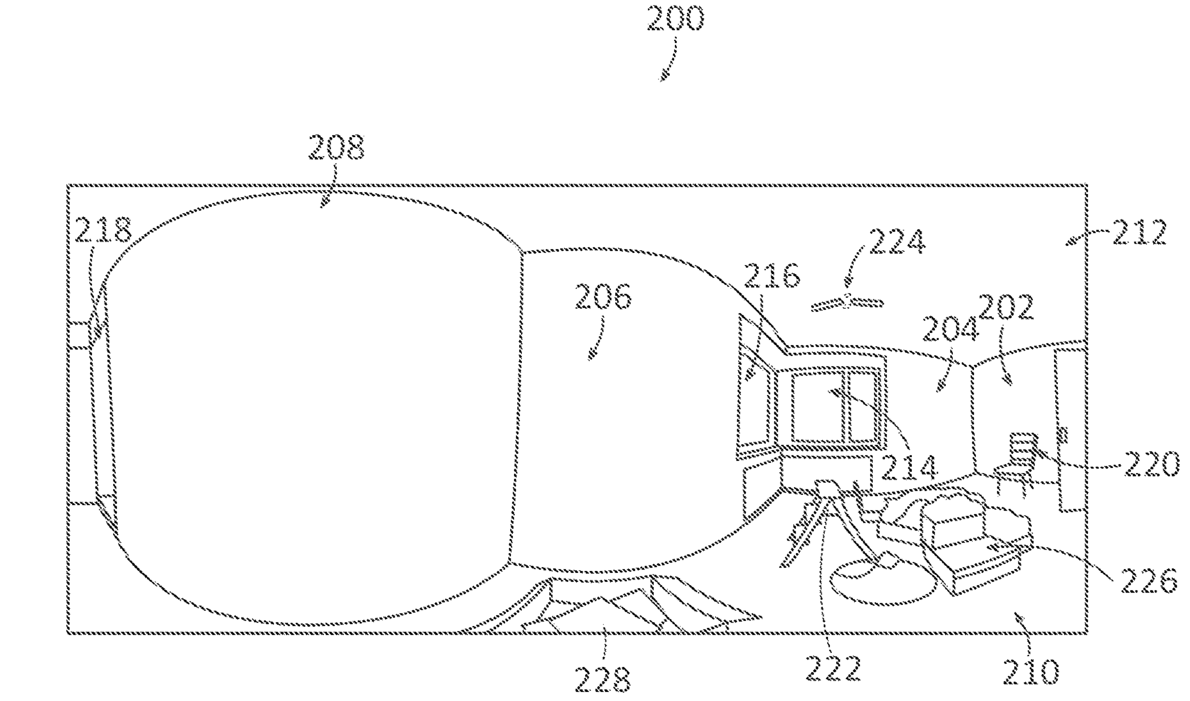
FIG. 2 is a non-limiting example of a digital image that is used to generate a 3D layout model according to an example embodiment of this disclosure.

FIG. 2, FIG. 3, FIG. 4, and FIG. 5 are non-limiting examples that illustrate aspects of the method 100. For example, FIG. 2 illustrates a non-limiting example of a digital image 200 that the model generation system 702 may receive. In FIG. 2, the digital image 200 is a panoramic image of a room. The digital image 200 displays, at least in part, the architectural elements that form an interior of a room along with a number of non-architectural elements in the room. For example, the architectural elements include at least (i) a set of walls (e.g., a first wall 202, a second wall 204, third wall 206, fourth wall 208), which define the room, (ii) a set of windows (e.g., first window 214, second window 216), which are located on adjacent walls that are connected to each other, (iii) a door 218, which is located on one of the walls, (iv) a floor 210, and (v) a ceiling 212. Meanwhile, the non-architectural elements include a number of items in the room such as a chair 220, a step stool 222, a ceiling light fixture 224, and a number of boxes (e.g., box 226, box 228, etc.).

Figure 3:
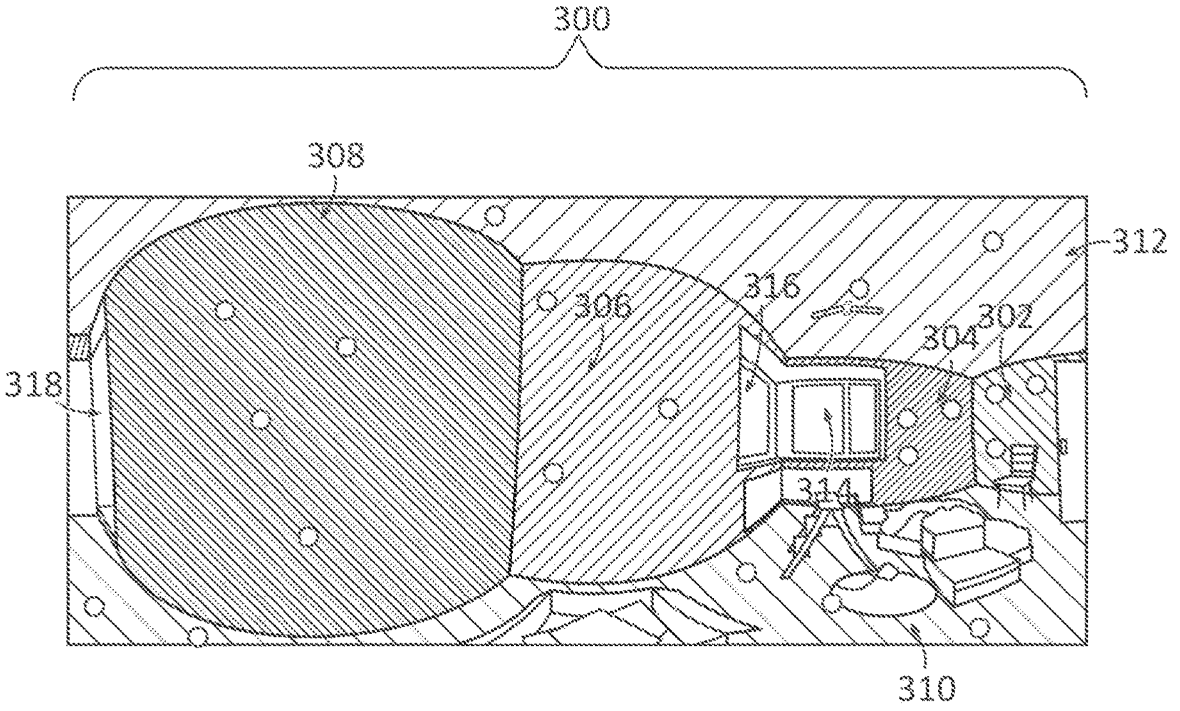
FIG. 3 is a non-limiting example of a visualization of instance segmentation data and depth data, which is generated for the digital image of FIG. 2, according to an example embodiment of this disclosure.

FIG. 3 is a visualization 300, which illustrates some examples of instance segmentation data of the digital image 200. In this regard, the model generation system 702 includes an ML system 712, which is configured to receive the digital image 200 as input data. The ML system 712 is configured to generate instance segmentation data using the digital image 200. The instance segmentation data includes a number of segmentation masks associated with objects displayed in the digital image 200. Each segmentation mask refers to a grouping of pixels that belong to a same identified object (e.g., architectural element) displayed in the digital image 200. For ease of viewing, each segmentation mask includes a different shading/color to indicate which pixels belong to that segmentation mask. With respect to digital photos relating to 3D layout construction, the objects include architectural elements and non-architectural elements. For instance, in the non-limiting example shown in FIG. 3, with respect to architectural elements, the segmentation masks include segmentation mask 302 that identifies a first wall, a segmentation mask 304 that identifies a second wall, a segmentation mask 306 that identifies a third wall, a segmentation mask 308 that identifies a fourth wall, a segmentation mask 310 that identifies a floor, a segmentation mask 312 that identifies a ceiling, a segmentation mask 314 that identifies a first window of the second wall, a segmentation mask 316 that identifies a second window of the third wall, and a segmentation mask 318 that identifies a door. Also, although not shown in the visualization 300, with respect to non-architectural elements, the instance segmentation data may include segmentation masks for these non-architectural elements (e.g., chair, step stool, boxes, a ceiling light fixture, etc.) displayed in the digital image 200. The segmentation masks are advantageous in identifying certain pixels as belonging to a particular object (e.g., architectural element).

In addition, the visualization 300 also displays some examples of depth data, which is generated by a depth estimator 716 based on the digital image 200. For ease and convenience of illustration, each depth point is illustrated as a dot on the visualization 300. As shown in FIG. 3, the depth estimator 716 generates at least three non-collinear 3D coordinate points of depth data, for each segmentation mask. More specifically, for example, the model generation system 702 associates a group of at least three non-collinear 3D coordinate points of depth data with a segmentation mask identified as a first wall. The model generation system 702 associates a group of at least three non-collinear 3D coordinate points of depth data with a segmentation mask identified as a second wall. the model generation system 702 associates a group of at least three non-collinear 3D coordinate points of depth data with a segmentation mask identified as a third wall. The model generation system 702 associates a group of at least three non-collinear 3D coordinate points of depth data with a segmentation mask identified as a fourth wall. The model generation system 702 associates a group of at least three non-collinear 3D coordinate points of depth data with a segmentation mask identified as a ceiling. The model generation system 702 associates a group of at least three non-collinear 3D coordinate points of depth data with a segmentation mask identified as a floor. The model generation system 702 is also configured to associate other groups of depth data with other segmentation masks that identify other elements (e.g., a door, a window, etc.).

Upon identifying and establishing a group of depth data for each segmentation mask, the model generation system 702 is configured to generate configuration estimation data. The configuration estimation data includes a set of planes. Each plane is defined by the group of depth data, which includes at least three non-collinear 3D coordinate points that are associated with a same segmentation mask. Each plane is defined by a plane equation.

After generating the set of planes, the model generation system 702 uses the boundary data of the segmentation masks to identify corresponding boundary estimate data for each plane. The model generation system 702 generates a plane segment for each plane by bounding that plane using corresponding boundary data of the corresponding segmentation mask. Next, upon generating the boundary estimate data for each plane, the model generation system 702 generates boundary tolerance data for each boundary estimate. The boundary tolerance data provides a plane buffer that extends a bound of a plane segment. The boundary tolerance data is a predetermined distance away from the boundary estimate. The boundary tolerance data is advantageous in providing a plane buffer that extends a bounding range of a plane segment in the event that the boundary estimate is misestimated.

Figure 4:
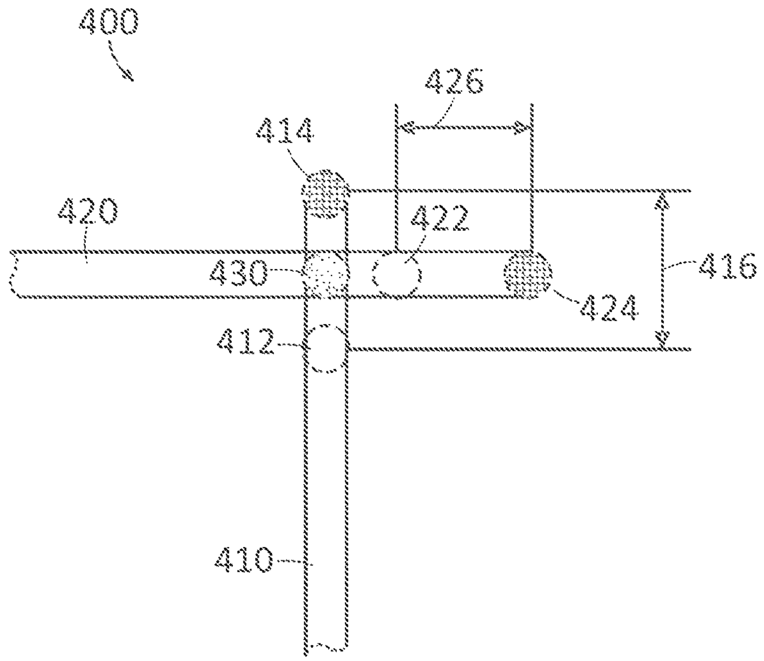
FIG. 4 is a non-limiting example of a visualization of constructing a connection between a first plane segment and a second plane segment using the boundary estimate data and the boundary tolerance data according to an example embodiment of this disclosure.

FIG. 4 is a visualization 400 of an example of top-down or birds-eye view of at least an end portion of a first plane segment 410, which is associated with a segmentation mask that identifies a first wall, and an end portion of a second plane segment 420, which is associated with a segmentation mask that identifies a second wall. These two plane segments are taken from the set of plane segments and used as examples to illustrate the 3D construction process of connecting plane segments. The visualization 400 also shows each plane with some perspective to illustrate that each plane represents a wall.

As shown in FIG. 4, the first plane segment 410 includes boundary estimate data 412, which is determined using boundary data of the segmentation mask associated with the first wall. Also, the second plane segment 420 includes boundary estimate data 422, which is determined using boundary data of the segmentation mask associated with the second wall. In addition, the first plane segment 410 includes boundary tolerance data 414, which extends the first plane segment 410 by a buffer 416 of a predetermined distance from the boundary estimate data 412. The second plane segment 420 includes boundary tolerance data 424, which extends the second plane segment 420 by a buffer 426 of a predetermined distance from the boundary estimate data 422.

As aforementioned, the model generation system 702 generates a number of planes. In this regard, regarding a scenario in which there is no boundary estimate data and no buffers for locating an intersection, then a number of non-parallel planes may intersect and may form a number of connections, boundary segments, and/or architectural elements, which do not exist in the actual environment itself. Also, since any two non-parallel planes may eventually intersect at some point, these intersections may generate a number of possible layouts. Taking this into account, the model generation system 702 is advantageous in (i) generating boundary estimate data using the boundary data of the segmentation masks as a guide, (ii) generating boundary tolerance data and plane buffers to account for a misestimation of the boundary estimate data, and (iii) using the boundary estimate data and the boundary tolerance data to determine a vicinity and general range for locating an actual intersection and an actual boundary segment, which then defines a bound for a plane segment. As such, the generation of boundary estimate data, boundary tolerance data, and boundary buffers enable the model generation system 702 to locate an actual connection between planes for the formation of the 3D layout model with professional grade precision.

In addition, the model generation system 702 locates an intersection between the first plane segment 410 and the second plane segment 420 using the boundary estimate data 412 and the boundary estimate data 422, as well as the boundary tolerance data 414 and the boundary tolerance data 424. The intersection may be located in a vicinity of the boundary estimate data 412, the boundary estimate data 422, the boundary tolerance data 414, and the boundary tolerance data 424. For example, the intersection is found to reside on the first plane segment 410 in a plane extension region of the buffer 416 at a location that is between the boundary estimate data 412 and the boundary tolerance data 414. The intersection is also found to reside on the second plane segment 420 at a location that is more inward than the boundary estimate data 422 such that the boundary estimate data 422 is between the intersection and the boundary tolerance data 424. The intersection is thus on the second plane segment 420 at a location that is more inward than the boundary tolerance data 424.

The first plane segment 410 and the second plane segment 420 are then connected at a boundary segment 430 defined at the intersection between the first plane segment 410 and the second plane segment 420. The first plane segment 410 is bounded at one end portion by the boundary segment 430, which defines a boundary of the room. In this non-limiting example, as shown in FIG. 4, the first plane segment 410 is now extended with respect to the boundary estimate data 412 via a part of the buffer such that the boundary segment 430 now defines a new boundary of the first plane segment 410. In addition, the second plane segment 420 is bounded at a corresponding end portion by the boundary segment 430, which defines the boundary of the room. In this case, as shown in FIG. 4, the second plane segment 420 is now shortened with respect to the boundary estimate data 422 such that the boundary segment 430 now defines a new boundary of the second plane segment 420. In this regard, each plane segment is indicative of a planar surface, corresponding to a particular segmentation mask, (e.g., wall, floor, ceiling, etc.) and each boundary segment is indicative of a connection between that planar surface and another planar surface.

Figure 5:
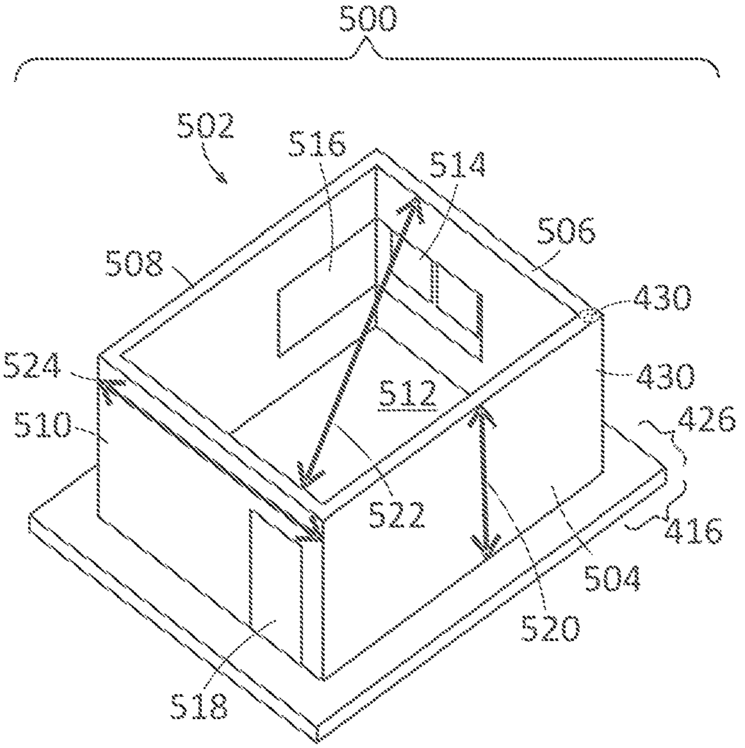
FIG. 5 is an example of a 3D layout model that is generated based on the digital image of FIG. 2 according to an example embodiment of this disclosure.

FIG. 5 is a non-limiting example of a 3D layout model 500, which is generated via the model generation system 702, based on the digital image 200. In this example, the 3D layout model 500 comprises a room 502, which includes (i) a first wall 504, (ii) a second wall 506 with a window 514, (iii) a third wall 508 with a window 516, (iv) a fourth wall 510 with a door 518, (v) a floor 512, and (vi) a ceiling (not shown). The first wall 504 has one end portion, which is bounded by and connected to the second wall 506, and an opposite end portion, which is bounded by and connected to the fourth wall 510. The second wall 506 has one end portion, which is bounded by and connected to the first wall 504, and an opposite end portion, which is bounded by and connected to the third wall 508. The third wall 508 has one end portion, which is bounded by and connected to the second wall 506, and an opposite end portion, which is bounded by and connected to the fourth wall 510. The fourth wall 510 has one end portion, which is bounded by and connected to the third wall 508, and an opposite end portion, which is bounded by and connected to the first wall 504. The floor 512 is bounded and connected to bottom portions of the first wall 504, the second wall 506, the third wall 508, and the fourth wall 510. Although not shown in FIG. 5, the 3D layout model 500 also includes a ceiling (not shown), which bounded by and connected to top portions of the first wall 504, the second wall 506, the third wall 508, and the fourth wall 510. Meanwhile, the other architectural elements, such as window 514, window 516, and door 518, may be located and rendered using the instance segmentation data (e.g., boundary data for those corresponding segmentation masks). As indicated in FIG. 5, the 3D layout model 500 is a 3D rendering of a layout of the room shown in FIG. 2.

In addition, FIG. 5 shows that a number of measurements may be made and generated with respect to the 3D layout model 500. A measurement may be made between any two locations, which are located within an interior of the room. As a non-limiting example, a set of measurements include measurement data 520, which is indicative of a height from a first wall 504, as defined by a dimension of the first wall 504 between the floor 512 and the ceiling. As another non-liming example, the set of measurements include measurement data 522, which is indicative of a dimension between one locus on the second wall 506 and another locus on the fourth wall 510. Also, as a non-liming example, the set of measurements include measurement data 524, which is indicative of a dimension of a width of the room 502, as defined by a dimension of the fourth wall 510 between the first wall 504 and the third wall 508. The set of measurements may be output by an I/O device (e.g., displayed by a display device, audio via a speaker device, etc.) for a user, may be used by a downstream module/system such as navigation module of a mobile robot, any suitable application, or any number and combination thereof.

Figure 6:
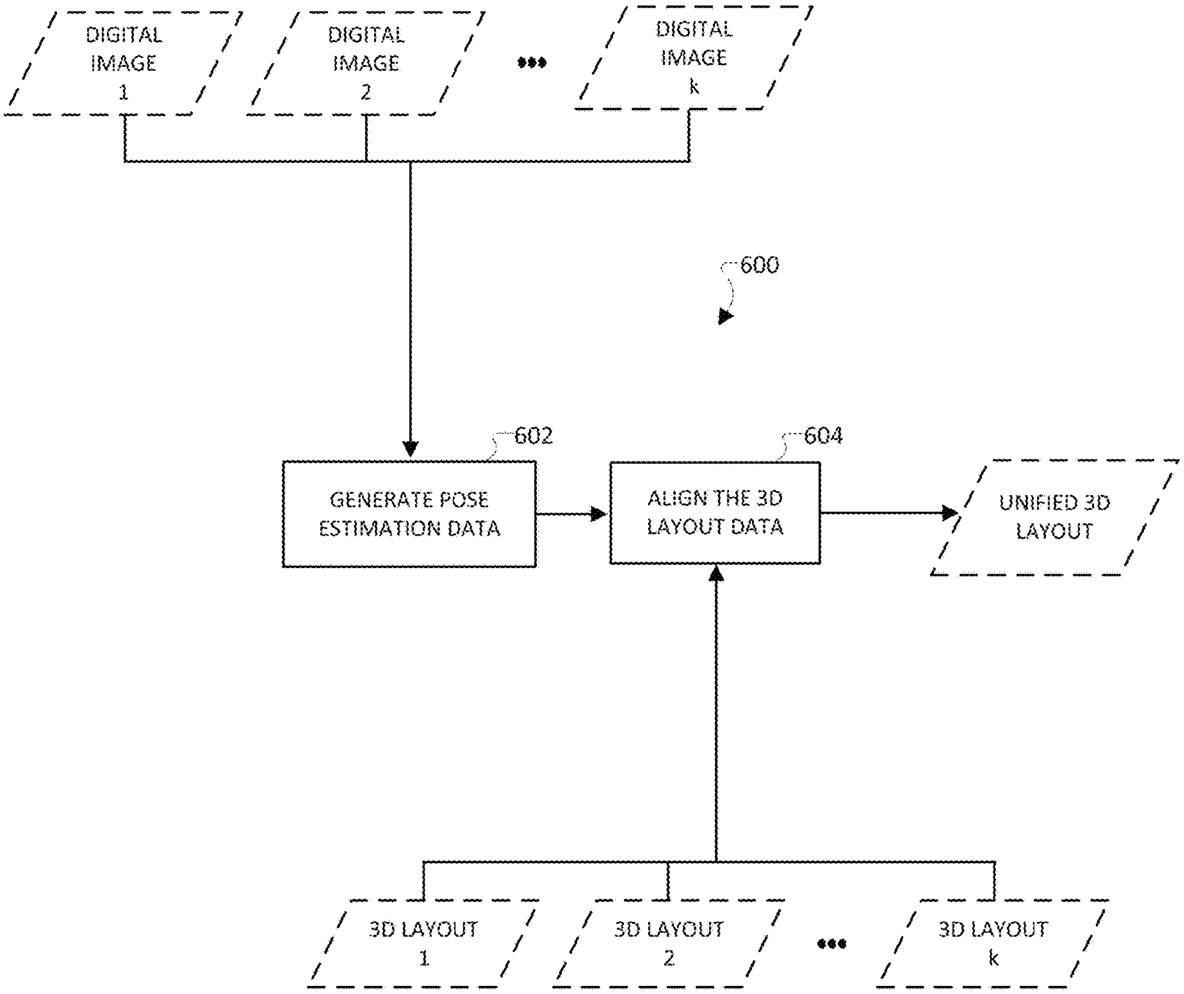
FIG. 6 is a flow diagram of an example of a method for generating a unified 3D layout model according to an example embodiment of this disclosure.

FIG. 6 is a flow diagram of an example of a method 600 of unifying 3D layout data and/or 3D layout models according to an example embodiment. The method 600 is performed, via the 3D layout model generator 710 and/or the model generation system 702, by one or more processors of the processing system 704 (FIG. 7). In this example, the method 600 includes a number of steps. The method 600 may include more steps or less steps than those steps shown in FIG. 6 provided that such modifications include similar functions and are within the spirit of the method 600.

At step 602, according to an example, the method 600 includes generating or estimating camera pose data. The camera pose data represents the position and orientation of an object (e.g., architectural element), usually in three dimensions. As shown in FIG. 6, the camera pose data is generated using a set of digital images, where k represents an integer number of digital images in the set and where k>1. For example, the set of digital images includes at least each digital image that was used to create each corresponding 3D layout structure and/or 3D layout model. As a non-limiting example, the set of digital images may include at least the digital image 200, which is used to create the 3D layout model 500, and another digital image (not shown), which is used to create another 3D layout structure/model (not shown).

The model generation system 702 and/or the 3D layout model generator 710 is configured to identify matching, common, and/or overlapping features via the instance segmentation data. For example, the 3D layout model generator 710 is configured to generate or estimate camera pose data based on geometric calculations relating to matching one or more plane segments from the set of plane segments of one digital image with one or more plane segments from another set of plane segments of another digital image. Upon generating or estimating the camera pose data, the method 600 proceeds to step 604.

At step 604, according to an example, the method 600 includes aligning a set of 3D layout data and/or 3D layout models. As shown in FIG. 6, the alignment involves a set of 3D layout data/models, where k represents an integer number of 3D layout data/models in the set and where k>1. As a non-limiting example, the set of 3D layout data/models may include at least the 3D layout model 500 and another 3D layout structure/model (not shown) such that a 3D unified layout model is created that combines these two 3D layouts. The model generation system 702 and/or the 3D layout model generator 710 aligns the set of 3D layout data/models using the camera pose data. The 3D layout model generator 710 generates a unified 3D layout model that is a combination of the set of 3D layout data/models, which are aligned according to the camera pose data.

In some implementations, when there is not a sufficient number of overlapping areas among the set of 3D layout data to generate camera pose data and/or when camera pose data is lacking, the model generation system 702 and/or the 3D layout model generator 710 is configured to use at least one computer vision algorithm to identify corresponding planes between the 3D layout data/models. Additionally or alternatively, a set of corresponding planes for unifying the 3D layout data/models may be manually defined. As an example, the set of corresponding planes for unifying 3D layout data/models may be received as input data from at least one user.

After the unified 3D layout model is generated, then the unified 3D layout model may be used in a number of different ways and a number of different applications. For example, the unified 3D layout model may be used to generate measurement data associated with various dimensions of the unified 3D layout model. The unified 3D layout model may be displayed by a display device or transmitted to another computing device. The unified 3D layout model may be modified by a user. In this regard, the unified 3D layout model may be outputted and/or used downstream.

FIG. 7 is a block diagram of an example of a system 700 with a model generation system 702, which is configured to generate a 3D layout model and/or a unified 3D layout model, according to an example embodiment. The system 700 and/or the model generation system 702 is configured to perform the method 100 of FIG. 1. The system 700 and/or the model generation system 702 includes at least a processing system 704. The processing system 704 includes at least one processing device. For example, the processing system 704 may include an electronic processor, a central processing unit (CPU), a graphics processing unit (GPU), a tensor processing unit (TPU), a microprocessor, a field-programmable gate array (FPGA), an application-specific integrated circuit (ASIC), any processing technology, or any number and combination thereof. The processing system 704 is operable to provide the functionality as described herein.

The system 700 and/or the model generation system 702 includes at least one sensor system 706. The sensor system 706 includes one or more sensors. For example, the sensor system 706 includes an image sensor, such as a camera that generates digital images. The sensor system 706 may include at least one other sensor, such as an inertial measurement unit (IMU), depending upon the specific application (e.g., robot) of the model generation system 702. The sensor system 706 is operable to communicate with one or more other components (e.g., processing system 704 and memory system 708) of the system 700. For example, the sensor system 706 may provide sensor data (e.g., digital images), which is then processed by the processing system 704, via the 3D layout model generator 710, to generate one or more 3D layout models, one or more unified 3D layout models, measurement data relating to one or more 3D layout models or unified 3D layout models, or any number and combination thereof. The sensor system 706 is local, remote, or a combination thereof (e.g., partly local and partly remote) with respect to one or more components of the system 700. Upon receiving the sensor data (e.g., one or more digital images), the processing system 704, via the 3D layout model generator 710, is configured to process this sensor data (e.g. digital images) in connection with the ML system 712, the other relevant data 714, or any number and combination thereof.

The system 700 and/or the model generation system 702 includes a memory system 708, which is operatively connected to the processing system 704. In this regard, the processing system 704 is in data communication with the memory system 708. The memory system 708 includes at least one non-transitory computer readable storage medium, which is configured to store and provide access to various data to enable at least the processing system 704 to perform the operations and functionality, as disclosed herein. The memory system 708 comprises a single memory device or a plurality of memory devices. The memory system 708 may include electrical, electronic, magnetic, optical, semiconductor, electromagnetic, or any suitable storage technology. For instance, the memory system 708 may include random access memory (RAM), read only memory (ROM), flash memory, a disk drive, a memory card, an optical storage device, a magnetic storage device, a memory module, any suitable type of memory device, or any number and combination thereof.

The memory system 708 includes at least a 3D layout model generator 710 with an ML system 712, as well as other relevant data 714, which are stored thereon. Each of these components include computer readable data that, when executed by the processing system 704, is configured to perform at least the functions disclosed in this disclosure. The computer readable data may include instructions, code, routines, various related data, any software technology, or any number and combination thereof. The 3D layout model generator 710 is configured to generate one or more 3D layout models, as well as one or more unified 3D layout models. In addition, the 3D layout model generator 710 is configured to generate measurement data relating to various dimensions taken with respect to one or more 3D layout models, one or more unified 3D layout models, or any number and combination thereof.

The ML system 712 includes at least one machine learning model, which is configured to perform instance segmentation. As a non-limiting example, the machine learning model may include an artificial neural network, a deep neural network, machine learning technology, or any number and combination thereof. More specifically, as discussed above, in response to receiving a digital image from the image sensor (e.g., camera), the ML system 712 is configured to generate instance segmentation data, which includes segmentation masks identifying various objects (e.g., one or more architectural elements) in a digital image. Also, the other relevant data 714 provides various data (e.g., operating system, etc.), which enables the system 700 and/or the model generation system 702 to perform the functions as discussed herein.

Also, the system 700 and/or the model generation system 702 includes a depth estimator 716. The depth estimator 716 is configured to generate depth data or a depth map. For instance, in an example embodiment, the depth estimator 716 comprises a machine learning system. The machine learning system includes at least one machine learning model, which is configured to generate depth data or a depth map in response to receiving one or more digital images as input data. In another example embodiment, the depth estimator 716 comprises a laser rangefinder, which is configured to generate depth data.

The system 700 and/or the model generation system 702 may include one or more I/O devices 718 (e.g., display device, microphone, speaker, etc.). As an example, for instance, the system 700 and/or the model generation system 702 may include a display device, which is configured to display one or more 3D layout models, one or more unified 3D layout models, measurement data relating to one or more of the 3D layout models, measurement data relating to one or more of the unified 3D layout models, or any number and combination thereof. Also, the system 700 and/or the model generation system 702 may include one or more I/O devices 718 to display the 3D layout model and receive input data, which allows for the modification of the 3D layout model. As a non-limiting example, for instance, the system 700 and/or the model generation system 702 includes a touchscreen on a mobile communication device that displays a first 3D layout model and then allows a user to delete a wall of the first 3D layout model and combine a second 3D layout model to the first 3D layout model. This feature is advantageous in enabling a user to interact with the model generation system 702 and one or more 3D layout models.

In addition, the system 700 includes other functional modules 720, such as any appropriate hardware, software, or combination thereof that assist with or contribute to the functioning of the system 700. For example, the other functional modules 720 include communication technology (e.g. wired communication technology, wireless communication technology, or a combination thereof) that enables components of the system 700 to communicate with each other and/or one or more computing devices 722 (e.g., mobile communication device, smart phone, laptop, tablet, etc.). The system 700 may also include a cloud computing system 724. The cloud computing system 724 is in data communication with the system 700 and the one or more other computing devices 722.

Also, the other functional modules 720 may include other components, such as an actuator. In this regard, for instance, when the model generation system 702 is employed in a robot vacuum, the other functional modules 720 further include one or more actuators, which relate to driving, steering, stopping, and/or controlling a movement of the robot vacuum based at least on the 3D layout model, the unified 3D layout model, measurement data relating to one or more 3D layout models or one or more unified 3D layout models, or any number and combination thereof.

As described in this disclosure, the system 700 and/or the model generation system 702 provides several advantages and benefits. For example, the model generation system 702 is configured to generate and construct 3D layout models without requiring or using a depth image (e.g., RGBD image). The system 700 and/or the model generation system 702 is configured to generate 3D layout models using an image sensor (e.g., RGB camera) with digital images comprising 2D data. In some embodiments, the model generation system 702 is configured to generate estimates of a depth map and/or depth data (e.g., dense depth data) via a machine learning system (e.g., CNN). These embodiments are advantageous in reducing the physical size and costs, which are associated with generating 3D layout models of professional grade and precision. In other embodiments, the model generation system 702 is configured to estimate the 3D configurations of depth data, which is generated via some sparse laser measurements taken by a laser rangefinder.

Also, the model generation system 702 is configured to construct one or more 3D layout models, as well as unified 3D layout models. In this regard, the model generation system 702 is configured to align multiple 3D layout models, which are generated from digital images via camera pose data and construct a unified larger 3D room layout that provides greater layout coverage of an environment. In addition, the model generation system 702 is configured to provide the added benefit of identifying different architectural elements in the 3D layout models. Furthermore, the model generation system 702 is advantageous in being configured to provide accurate measurement data with respect to various dimensions of the 3D layout models and/or the unified 3D layout models. The model generation system 702 is configured to provide at least these features at a relatively low cost. Moreover, the model generation system 702 is configured to provide these 3D layout models and/or unified 3D layout models downstream so that they may be used in various applications (e.g., robotics, augmented reality, virtual reality, etc.).

Furthermore, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally, or alternatively, components and functionality may be separated or combined differently than in the manner of the various described embodiments and may be described using different terminology. These and other variations, modifications, additions, and improvements may fall within the scope of the disclosure as defined in the claims that follow.

The invention claimed is:

1. A computer-implemented method comprising:

receiving a digital image, the digital image comprising two-dimensional data;

generating instance segmentation data using the digital image, the instance segmentation data including segmentation masks identifying architectural elements in the digital image;

generating depth data using the digital image;

generating a set of planes, each plane being generated using the depth data of a corresponding segmentation mask, the set of planes including at least a first plane and a second plane;

generating boundary estimate data for the set of planes using corresponding boundary data of the segmentation masks;

generating a set of plane segments by bounding the set of planes using the boundary estimate data, the set of plane segments include a first plane segment corresponding to a bounding of the first plane and a second plane segment corresponding to a bounding of the second plane;

generating boundary tolerance data for each boundary estimate, each boundary tolerance data creating a plane buffer that extends a corresponding boundary estimate by a predetermined distance;

locating an intersection of the first plane segment and the second plane segment that falls within at least one plane buffer created by the boundary estimate data and the boundary tolerance data; and constructing a 3D layout model that includes at least a boundary segment connecting the first plane segment and the second plane segment at the located intersection.

2. The computer-implemented method of claim 1, wherein the depth data is generated via a convolutional neural network (CNN) using the digital image.

3. The computer-implemented method of claim 1, further comprising:

performing laser measurements via a laser range finder; and generating the depth data using the laser measurements in association with the digital image.

4. The computer-implemented method of claim 1, wherein:

the set of planes further include at least a third plane; and the segmentation masks identify a wall, a floor, or a ceiling.

5. The computer-implemented method of claim 1, further comprising:

generating measurement data based on the 3D layout model, wherein the measurement data indicates a dimension between a first locus on the first plane and a second locus on the second plane.

6. The computer-implemented method of claim 1, further comprising:

performing an action using the 3D layout model, wherein, the action includes outputting the 3D layout model to an input/output device or controlling an actuator using the 3D layout model.

7. The computer-implemented method of claim 1, further comprising:

receiving another 3D layout model that is generated based on an another digital image;

generating camera pose data by matching one or more segmentation masks of the digital image with one or more another segmentation masks of the another digital image; and generating unified 3D layout model by aligning the 3D layout model with the another 3D layout model using the camera pose data.

8. A system comprising:

one or more processors;

one or more computer memory in data communication with the one or more processors, the one or more computer memory having computer readable data stored thereon, the computer readable data including instruction that, when executed by one or more processors, causes the one or more processors to perform a method, the method including receiving a digital image, the digital image comprising two-dimensional data; generating instance segmentation data using the digital image, the instance segmentation data including segmentation masks identifying architectural elements in the digital image;

generating depth data using the digital image;

generating a set of planes, each plane being generated using the depth data of a corresponding segmentation mask, the set of planes including at least a first plane and a second plane;

generating boundary estimate data for the set of planes using corresponding boundary data of the segmentation masks;

generating a set of plane segments by bounding the set of planes using the boundary estimate data, the set of plane segments include a first plane segment corresponding to a bounding of the first plane and a second plane segment corresponding to a bounding of the second plane;

generating boundary tolerance data for each boundary estimate, each boundary tolerance data extending a corresponding boundary estimate by a predetermined distance;

locating an intersection of the first plane segment and the second plane segment that falls within at least one plane buffer created by the boundary estimate data and the boundary tolerance data; and constructing a 3D layout model that includes at least a boundary segment connecting the first plane segment and the second plane segment at the located intersection.

9. The system of claim 8, wherein the depth data is generated via a convolutional neural network (CNN) using the digital image.

10. The system of claim 8, further comprising:

performing laser measurements via a laser range finder; and generating the depth data using the laser measurements in association with the digital image.

11. The system of claim 8, wherein:

the set of planes further include at least a third plane; and the segmentation masks identify a wall, a floor, or a ceiling.

12. The system of claim 8, wherein the method further comprises:

generating measurement data based on the 3D layout model, the measurement data indicating a dimension between a first locus on the first plane and a second locus on the second plane.

13. The system of claim 8, wherein the method further comprises:

performing an action using the 3D layout model, wherein, the action includes (i) outputting the 3D layout model to an input/output (I/O) device or (ii) controlling an actuator using the 3D layout model.

14. The system of claim 8, wherein the method further comprises:

receiving another 3D layout model that is generated based on an another digital image;

generating camera pose data by matching one or more segmentation masks of the digital image with one or more another segmentation masks of the another digital image; and generating unified 3D layout model by aligning the 3D layout model with the another 3D layout model using the camera pose data.

15. One or more non-transitory computer readable mediums having computer readable data stored thereon, the computer readable data including instructions that, when executed by one or more processors, cause the one or more processors to perform a method, the method comprising:

receiving a digital image, the digital image comprising two-dimensional data;

generating instance segmentation data using the digital image, the instance segmentation data including segmentation masks identifying architectural elements in the digital image;

generating depth data using the digital image;

generating a set of planes, each plane being generated using the depth data of a corresponding segmentation mask, the set of planes including at least a first plane and a second plane;

generating boundary estimate data for the set of planes using corresponding boundary data of the segmentation masks;

generating a set of plane segments by bounding the set of planes using the boundary estimate data, the set of plane segments include a first plane segment corresponding to a bounding of the first plane and a second plane segment corresponding to a bounding of the second plane, generating boundary tolerance data for each boundary estimate, each boundary tolerance data extending a corresponding boundary estimate by a predetermined distance;

locating an intersection of the first plane segment and the second plane segment that falls within at least one plane buffer created by the boundary estimate data and the boundary tolerance data as a range for locating the intersection; and constructing a 3D layout model that includes at least a boundary segment connecting the first plane segment and the second plane segment at the located intersection.

16. The one or more non-transitory computer readable mediums of claim 15, wherein the depth data is generated via a convolutional neural network (CNN) using the digital image.

17. The one or more non-transitory computer readable mediums of claim 15, wherein the method further comprises:

performing laser measurements via a laser range finder; and generating the depth data using the laser measurements in association with the digital image.

18. The one or more non-transitory computer readable mediums of claim 15, wherein:

the set of planes further include at least a third plane; and the segmentation masks identify a wall, a floor, or a ceiling.

19. The one or more non-transitory computer readable mediums of claim 15, wherein the segmentation masks further identify a window or a door.

20. The one or more non-transitory computer readable mediums of claim 15, wherein the method further comprises:

generating measurement data based on the 3D layout model, the measurement data indicating a dimension between a first locus on the first plane and a second locus on the second plane.

* * * * *